US012023823B2

(12) United States Patent
Ludeman et al.

(10) Patent No.: US 12,023,823 B2
(45) Date of Patent: Jul. 2, 2024

(54) FOOD SLICER

(71) Applicant: Williams-Sonoma, Inc., San Francisco, CA (US)

(72) Inventors: Karl Edward Ludeman, Oakland, CA (US); Caleb Ferris, Oakland, CA (US)

(73) Assignee: Williams-Sonoma, Inc., San Francisco, CA (US)

( * ) Notice: Subject to any disclaimer, the term of this patent is extended or adjusted under 35 U.S.C. 154(b) by 0 days.

(21) Appl. No.: 17/875,801

(22) Filed: Jul. 28, 2022

(65) Prior Publication Data

US 2023/0033810 A1 Feb. 2, 2023

Related U.S. Application Data

(60) Provisional application No. 63/226,293, filed on Jul. 28, 2021.

(51) Int. Cl.
*B26D 7/00* (2006.01)

(52) U.S. Cl.
CPC .................................. *B26D 7/0006* (2013.01)

(58) Field of Classification Search
CPC ...... B26D 3/30; B26D 3/28; B26D 2003/287; B26D 2003/286; B26D 7/0006; B26B 5/007; B26B 2029/066; B26B 29/063; B26B 29/06
See application file for complete search history.

(56) References Cited

U.S. PATENT DOCUMENTS

| | | | | | |
|---|---|---|---|---|---|
| 3,347,296 | A * | 10/1967 | Rothman | B26D 3/30 D7/673 |
| 4,550,636 | A * | 11/1985 | Josselson | B26B 29/063 83/762 |
| D410,366 | S * | 6/1999 | Chiasson | D7/673 |
| 8,474,359 | B2 * | 7/2013 | George | B26B 29/063 83/761 |
| 9,333,661 | B1 * | 5/2016 | Nguyen | B26B 29/063 |
| 9,925,679 | B2 * | 3/2018 | Slutsky | B26B 29/063 |

FOREIGN PATENT DOCUMENTS

FR 3034035 A1 * 9/2016

* cited by examiner

*Primary Examiner* — Jennifer S Matthews
(74) *Attorney, Agent, or Firm* — Cook Alex Ltd.

(57) ABSTRACT

A food slicing device is disclosed. The food slicing device comprises a body configured to contain at least one food item and a lid having a protecting member. The body has a plurality of recesses defined within the body that are configured to receive a cutting blade of a knife or the like. The lid is hingedly attached to the body and is configured to move between a first position where the lid at least partially covers a top opening of the body, and a second position wherein the lid does not cover the top opening of the body.

12 Claims, 3 Drawing Sheets

FOOD SLICER

CLAIM OF PRIORITY

This application claims the benefit of U.S. Provisional Application No. 63/226,293, filed Jul. 28, 2021, the contents of which are hereby incorporated by reference in their entirety.

TECHNICAL FIELD

The present disclosure generally relates to food preparation tools. More particularly, the present disclosure relates to food slicing devices.

BACKGROUND

To slice a food item, a cook typically holds the food item with one hand and holds a knife with the other hand. However, it may be difficult for the cook to hold the food item steadily in order to get a satisfactory cut. Furthermore, oftentimes each food item must be cut individually. There is also a risk of getting a cut finger or hand when trying to cut items—in particular small, oddly shaped, or tough food items. A food slicing device that addresses these issues is desirable.

SUMMARY

There are several aspects of the present subject matter which may be embodied separately or together in the devices and systems described and claimed below. These aspects may be employed alone or in combination with other aspects of the subject matter described herein, and the description of these aspects together is not intended to preclude the use of these aspects separately or the claiming of such aspects separately or in different combinations as set forth in the claims appended hereto.

In a first aspect, a food slicing device is disclosed. The food slicing device comprises a body configured to contain at least one food item and a lid having a protecting member. The body has a recess defined within the body and the recess is configured to receive a blade. The lid is hingedly attached to the body and is configured to move from a first position where the lid at least partially covers the body, to a second position wherein the lid does not cover the body.

In another aspect, a method for slicing multiple food items comprises the steps of providing a body having one or more sidewalls with opposing slots, placing multiple food items within the body and moving a cutting blade through the opposing slots.

DESCRIPTION OF THE ILLUSTRATED EMBODIMENTS

The embodiments disclosed herein are for the purpose of providing a description of the present subject matter, and it is understood that the subject matter may be embodied in various other forms and combinations not shown in detail. Therefore, specific embodiments and features disclosed herein are not to be interpreted as limiting the subject matter as defined in the accompanying claims.

Food slicing devices according to the present disclosure and their individual components may be variously configured without departing from the scope of the present disclosure.

Figure 1:
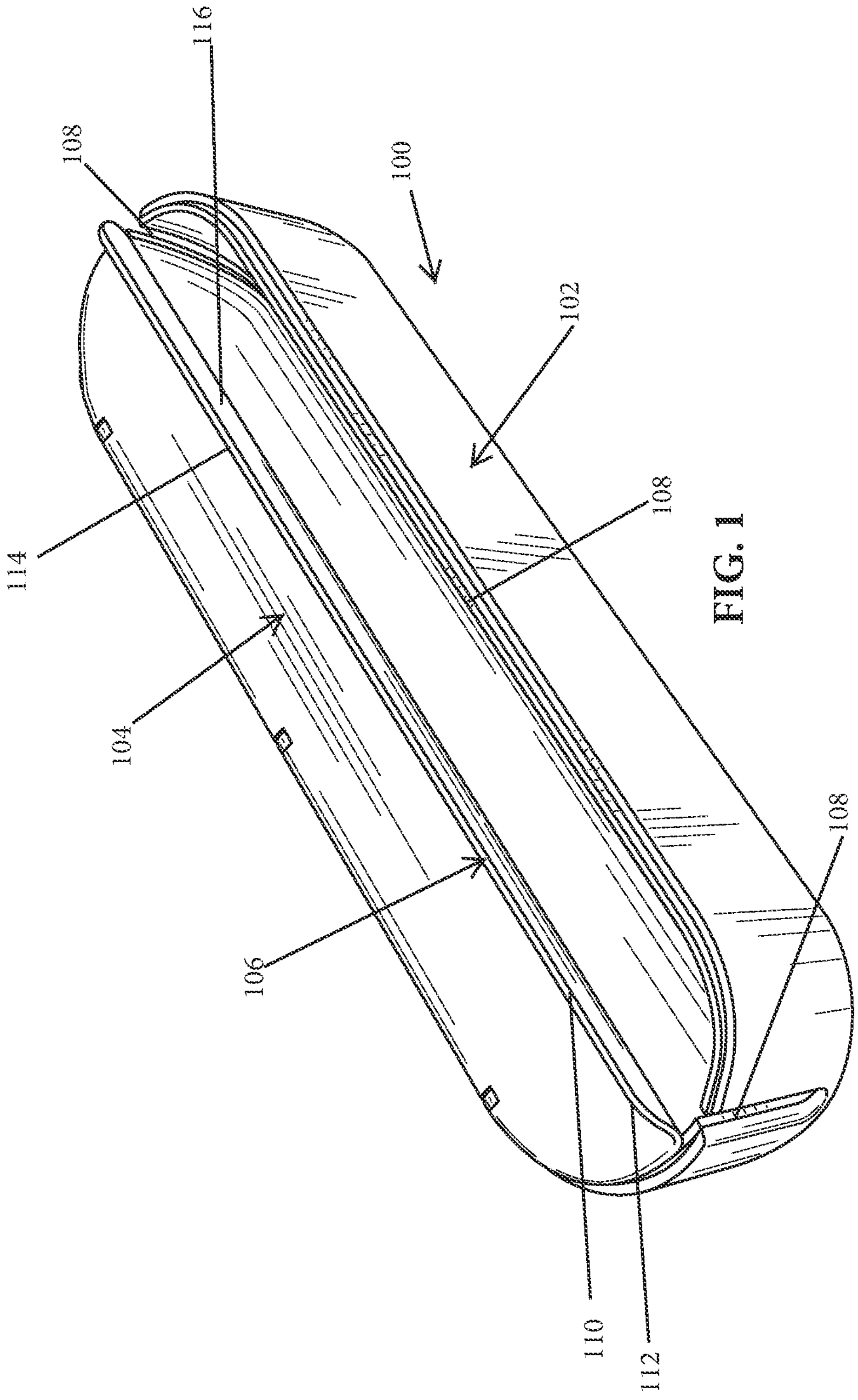
FIG. 1 is a perspective view of an embodiment of a food slicing device, showing the device in a first configuration.
Figure 2:
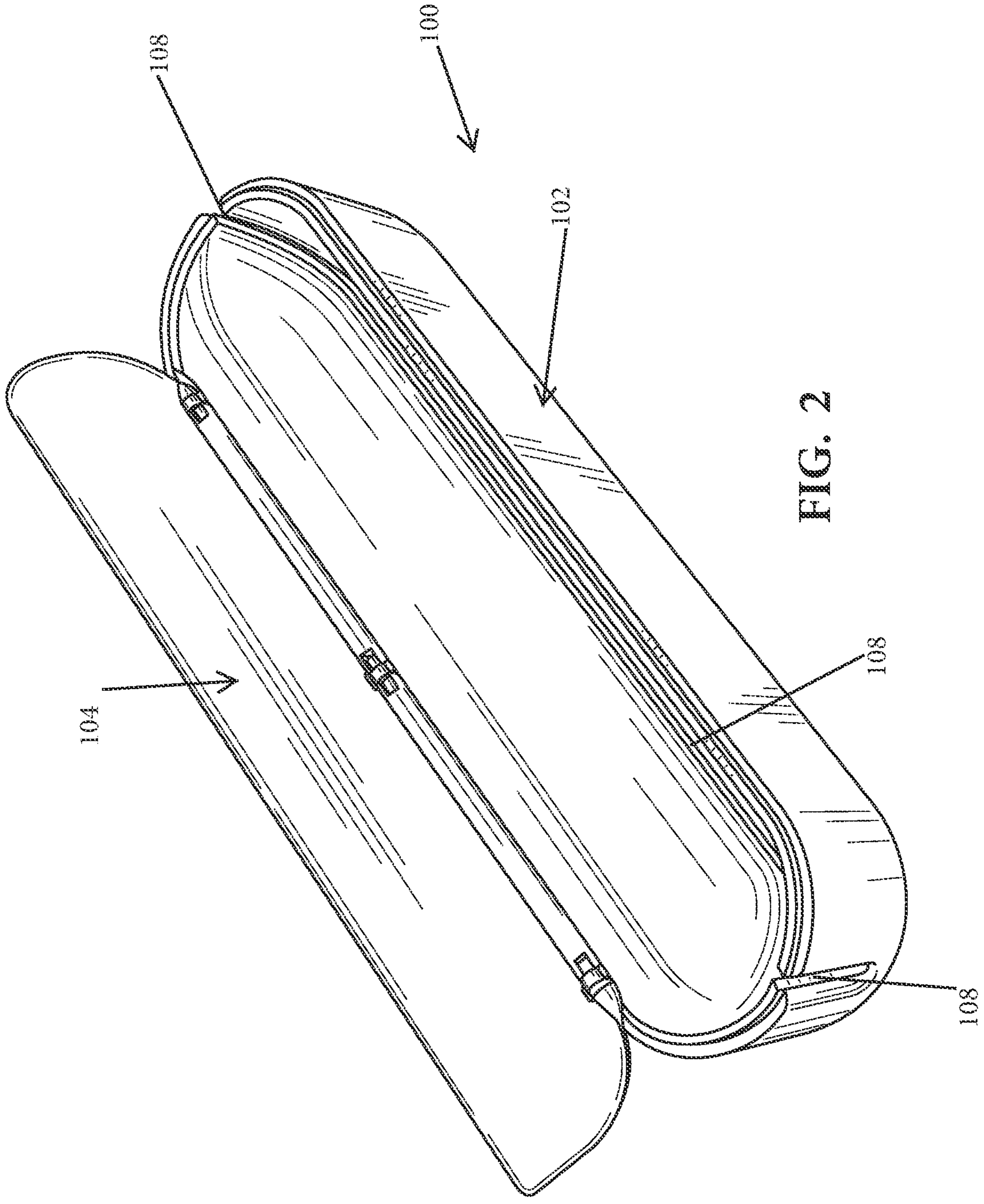
FIG. 2 is a perspective view of the slicing device of FIG. 1, showing the device in a second configuration.
Figure 3:
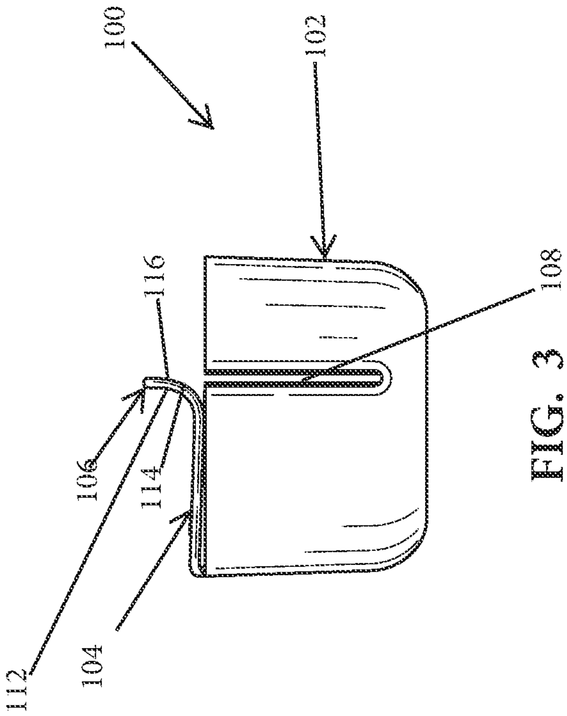
FIG. 3 is a side elevational view of the slicing device of FIG. 1.

An embodiment of the food slicing device of the disclosure is indicated in general at 100 in FIGS. 1-3. The food slicing device 100 includes a body 102 featuring a continuous sidewall and a curved or concave (with respect to the body interior) bottom. The body 102 is configured to contain at least one food item and features a top opening, defined by the top edge of the sidewall, through which the at least one food item may pass. In alternative embodiments, the body may feature discontinuous sidewalls and/or a flat bottom, or a bottom including multiple recesses or other structures or raised portions configured to hold multiple food items.

A lid 104 has a protecting member 106 and is attached to the top edge of the sidewall of the body 102 by a hinge along one edge. As a result, the lid 104 is configured to move between a first position and a second position. FIGS. 1 and 3 show the food slicing device 100 in a first configuration, where the lid 104 at least partially covers the top opening of the body 102. FIG. 2 shows the food slicing device 100 in a second configuration, where the lid 104 does not cover the top opening of the body 102.

The protecting member 106 has an interior surface 116 and an exterior surface 114. As shown in FIG. 1, in an embodiment the protecting member 106 may include a raised edge 110 formed by an arcuate portion 112. The raised edge 110 may act as a guide for a slicing blade, such as a knife. When a user slices food items contained within the body 102, the raised edge 110 may contact the blade to guide the blade's cutting path and ensure that the blade does not cut off-course. Moreover, by keeping the blade on track, the raised edge 110 serves as a shield for a user's finger or hand that is positioned on the lid.

As shown in FIGS. 1-3, recesses 108 are defined within the sidewall at the ends of the body 102. In the illustrated embodiment, a pair of recesses are illustrated positioned within opposing portions of the sidewall of the body. In alternative embodiments, there may be more than two recesses positioned through other portions of the body and/or the body may include multiple sidewalls with voids between the multiple sidewalls defining the recesses. The recesses 108 are configured to receive the slicing blade of a knife or the like. The recesses may be configured to receive blades/blade edges of various widths, lengths, and heights. The recesses 108 may be configured as any appropriate shape, including as a slot and at various angles and orientations within the body (i.e. other than the vertical orientation shown). During slicing of a food item, a user may insert the blade into the recesses 108 such that the blade moves from a first blade position in the recess where the blade has not made contact with the food items to a second blade position where the blade has sliced through the food items. In the second blade position, the blade rests in the bottoms recesses at the bottom of the body 102.

When the lid 104 is in a first position so that the device 100 is in the first configuration, the raised edge 110 of the protecting member 106 is configured to align with the recesses 108. A user inserts the blade into the recesses 108 and uses the raised edge 110 to guide the blade as the blade slices the food item contained within the body 102.

As shown in FIG. 2, the lid 104 may be moved into a second position. When in the second position, the lid 104 is opened so that interior of the body 102 is fully exposed. This configuration allows a user to insert the food items into the body 102. After the food items are inserted, the user lowers the lid 104 into the first position for slicing. After slicing, the user raises the lid 104, from the first position to the second position for removal of the sliced food items. When in the second position, the user may invert the slicing device 100 so that the food items within the body 102 falls out of the body 102.

In an exemplary embodiment, the food item may be a number of cherry tomatoes. However, any other suitable food item may be placed in the body 102 for slicing.

At least one of the slicing device lid 104 and the device body 102 may be made of a plastic such as polyvinyl chloride (PVC) or polyethylene terephthalate (PET). Additionally, any other suitable materials known to a skilled person (for example, stainless steel) may be used to make the slicing device 100.

It will be understood that the embodiments described above are illustrative of some of the applications of the principles of the present subject matter. Numerous modifications may be made by those skilled in the art without departing from the spirit and scope of the claimed subject matter, including those combinations of features that are individually disclosed or claimed herein. For these reasons, the scope hereof is not limited to the above description but is as set forth in the following claims, and it is understood that claims may be directed to the features hereof, including as combinations of features that are individually disclosed or claimed herein.

What is claimed is:

1. A food slicing device comprising:

a body configured to contain at least one food item, the body having a top opening configured to receive the at least one food item and a plurality of recesses defined within the body configured to receive a blade; and a lid having a protecting member with an arcuate portion that includes a raised edge defined by the arcuate portion wherein the raised edge is configured to guide the blade, the lid being hingedly attached to the body and configured to move between a first position, where the lid only partially covers the top opening of the body, and a second position wherein the lid does not cover the top opening of the body.

2. The food slicing device of claim 1, wherein at least a portion of the protecting member is configured to align with the plurality of recesses.

3. The food slicing device of claim 1, wherein the plurality of recesses includes a pair of recesses positioned within opposing sides of the body.

4. The food slicing device of claim 3, wherein the pair of recesses are a pair of slots.

5. The food slicing device of claim 4, wherein the pair of slots are vertical.

6. The food slicing device of claim 1, wherein at least one of the lid and body is made of a plastic.

7. The food slicing device of claim 1, wherein the body includes a continuous sidewall.

8. The food slicing device of claim 7, wherein the body includes a concave bottom.

9. The food slicing device of claim 1, wherein the body includes a concave bottom.

10. The food slicing device of claim 1, wherein the raised edge is configured to align with the plurality of recesses.

11. The food slicing device of claim 1, wherein the lid extends only to the plurality of recesses.

12. The food slicing device of claim 1, wherein the lid covers approximately 50 percent of the top opening.

* * * * *